United States Patent
Joyce et al.

[19]

[11] Patent Number: 5,971,503
[45] Date of Patent: Oct. 26, 1999

[54] HYDRAULIC CONTROL UNIT WITH AMBIENT TEMPERATURE COMPENSATION DURING FLUID PRESSURE DELIVERY

[75] Inventors: John Patrick Joyce, Grosse Pointe Park; Todd Allen Brown, Dearborn, both of Mich.

[73] Assignee: Ford Global Technologies, Inc., Dearborn, Mich.

[21] Appl. No.: 09/016,936

[22] Filed: Feb. 3, 1998

[51] Int. Cl.⁶ ...................................................... B60T 8/32
[52] U.S. Cl. .......................................................... 303/191
[58] Field of Search .............................. 137/79, 596.13, 137/596.16; 251/129.01, 129.11; 303/71, 191, 119.1; 364/426.028, 426.034

[56] References Cited

U.S. PATENT DOCUMENTS

| | | | |
|---|---|---|---|
| 3,253,409 | 5/1966 | Kellogg et al. | 60/52 |
| 3,509,316 | 4/1970 | Fresolo | 219/201 |
| 4,262,969 | 4/1981 | Chatterjea | 303/71 |
| 4,858,649 | 8/1989 | Satoh et al. | 137/625.6 |
| 5,188,433 | 2/1993 | Reiuartz et al. | 303/100 |
| 5,251,440 | 10/1993 | Bong-dong et al. | 60/329 |
| 5,253,470 | 10/1993 | Newton | 60/39.08 |
| 5,275,476 | 1/1994 | Maisch | 303/113.2 |
| 5,410,878 | 5/1995 | Lee et al. | 60/327 |
| 5,468,058 | 11/1995 | Linkner, Jr. | 303/115.2 |
| 5,551,770 | 9/1996 | Hrovat et al. | 303/167 |
| 5,562,190 | 10/1996 | McArthur | 192/57 |
| 5,600,954 | 2/1997 | Bay et al. | 60/454 |
| 5,662,390 | 9/1997 | Wies et al. | 303/10 |
| 5,667,051 | 9/1997 | Goldberg et al. | 192/85 |

*Primary Examiner*—Chris Schwartz
*Attorney, Agent, or Firm*—Gregory P. Brown; Roger L. May

[57] ABSTRACT

A hydraulic control unit capable of being used in an automotive vehicle wheel brake system includes a pressure generator such as a master cylinder for a vehicle wheel brake system that includes automatic brake control features. Solenoid-operated valves are used to control the flow of brake fluid to and from the fluid pressure actuators for front and rear brakes. A fluid reservoir is used for storing hydraulic fluid in the hydraulic control unit. A source of electrical energy, such as a solenoid-operated valve, is used to heat the hydraulic fluid to reduce fluid viscosity and thus enhance control unit performance.

4 Claims, 2 Drawing Sheets

HYDRAULIC CONTROL UNIT WITH AMBIENT TEMPERATURE COMPENSATION DURING FLUID PRESSURE DELIVERY

TECHNICAL FIELD

The invention relates to a hydraulic control unit in which fluid is distributed from a fluid pressure generator with compensation for ambient temperature changes.

BACKGROUND OF THE INVENTION

Hydraulic control systems typically use fluid pressure pumps situated remotely with respect to powered actuators. Pressure distributor conduits extend between the high pressure side of the pump and the actuators. A fluid reservoir for hydraulic fluid is located on the inlet side of the pump.

Pressure distribution to the actuators is controlled by remote control valves that respond to control signals from a controller. Typical examples of a hydraulic control system of this kind may be seen by referring to U.S. Pat. No. 5,468,058 and U.S. Pat. No. 5,551,770. The '058 patent discloses an anti-lock brake system for an automotive vehicle, and the '770 patent discloses a yaw control system for an automotive vehicle. Control systems of this type are commonly used also for traction control purposes where wheel torque can be modulated in response to signals from wheel speed sensors that detect incipient wheel slip.

The pump in a control system for an automotive vehicle having anti-lock brake capabilities or yaw control capabilities receives a supply of low pressure hydraulic fluid from a reservoir. The pump distributes hydraulic fluid under high pressure to brake actuators. Anti-lock brake performance, traction control performance, and yaw control performance can be adversely affected during cold temperature operation by reason of the increased viscosity of the brake fluid. The ability of the system to apply braking torque to the vehicle wheels during operation of the system in certain control modes, —for example, when the driver is not applying braking pressure to the brake pedal, —may be degraded by cold operating temperatures because the increased viscosity of the brake fluid may restrict delivery of fluid to the brake actuators.

It is known design practice to compensate for the adverse affect of cold temperature by designing the hydraulic control system with large diameter pressure distribution conduits extending from the reservoir to the low pressure side of the pump, which reduces flow restriction in the flow path for the hydraulic fluid. It is known design practice also to provide for an increased pressure differential between the pump inlet and the hydraulic reservoir. This can be accomplished by using a pressurized reservoir or an auxiliary pre-charge pump or by applying master cylinder pressure with an electrically actuated booster. Pressurized accumulators also may be used in conjunction with a fluid pressure reservoir for storing reservoir fluid under high pressure to mitigate the effect of an increase in fluid viscosity as fluid temperature decreases.

U.S. Pat. No. 3,253,409 discloses a hydraulic brake booster system in which heat is generated by a fluid pump or by an independent heat source to increase oil temperature in the booster system. Such an arrangement would not be feasible, however, in an anti-lock brake system, a yaw control system or a traction control system where oil temperature on the inlet side of the control pump must be controlled to reduce viscosity.

U.S. Pat. No. 5,600,954 discloses a hydraulic control system for an agricultural tractor. The system has a pre-charge pump that communicates at its inlet side with an oil reservoir. A heating element in the reservoir maintains an elevated oil temperature. This is intended to control viscosity in the valve circuit on the outlet side of the control pumps. Such a system would not be feasible, however, in an anti-lock brake system, a yaw control system or a traction control system for an automotive vehicle because of a lack of viscosity control at the inlet side of the control pump.

SUMMARY OF THE INVENTION

It is an objective of the invention to provide a hydraulic control system with a hydraulic control unit in which provision is made for enhancing performance in cold temperature. A source of electrical energy is used to warm the hydraulic fluid under cold operating conditions.

The invention includes conventional sensors and logic devices and actuators for warming the hydraulic fluid, thereby avoiding the necessity of using a separate energy source for creating heat in the hydraulic control unit to overcome viscous losses.

Temperature data from climate control or engine control sensor devices in an automotive vehicle are used by an electronic processor to predict the operating temperature of the hydraulic fluid used in the hydraulic control system of the invention. The processor, which controls an electrical energy source, can be calibrated to receive that data and to establish an appropriate electric current value.

In a preferred embodiment of the invention, the hydraulic control system uses solenoid-operated pressure distributor valves situated in pressure distributor conduits between the pump and the pressure-operated actuators for controlling pressure distribution to the actuators, the solenoid-operated valves being under the control of the electronic processor that responds to sensor signals. The solenoids may be used as a heat source for warming the hydraulic fluid. Although an energy source such as a dedicated heating element may be used, the use of the solenoids in a solenoid-operated valve mechanism avoids the necessity for designing a dedicated energy source for maintaining a fluid temperature higher than ambient temperature.

The solenoids for the solenoid-operated valves may be actuated briefly and repeatedly so that the mechanical state of the valve itself does not change. This generates heat in the hydraulic fluid but does not alter the hydraulic flow nor generate valve noise.

Some automotive brake control systems have the ability to develop brake torque when the driver is not applying the brake pedal (e.g., yaw controllers and traction controllers). Such brake systems typically use a brake actuator, a pre-charge pump, a hydraulic control unit, an electronic control unit and pressure-operated brakes at each wheel. In contrast, it is not necessary in the hydraulic control unit of the invention to provide a pre-charge pump or any other device for the purpose of applying pressure to the fluid between the pump and the reservoir to assist in fluid delivery from the reservoir to the inlet of the pump in the hydraulic control unit.

During operation of the brake system of the invention, the pump in the hydraulic control unit receives fluid from a reservoir that may be mounted on the master cylinder assembly for the brake system. The fluid then is pushed into the brakes. Restrictions in the flow path of the fluid from the reservoir to the inlet of the pump affect the flow rate. These restrictions on the intake side of the is pump affect the flow to a much greater extent than any restriction on the outlet side of the pump because the largest pressure differential that can be developed on the inlet side of the pump is limited to one bar. That is, the minimum absolute pressure that can be generated by the pump inlet is zero bar, whereas ambient pressure at the reservoir is equal to approximately one bar.

When the fluid reaches the pump, the pressure is raised sufficiently to achieve adequate flow to the wheel brakes. The restriction to flow on the inlet side of the pump, however, increases significantly as the temperature of the fluid drops and the fluid viscosity increases.

Provision is made in the improved hydraulic control unit of the invention to raise the temperature of the fluid along the path extending from the reservoir to the pump. This may include introducing an electrically actuated heating element at the reservoir, at the master cylinder or in the hydraulic pressure distributor conduits between the reservoir and the pump. If heat developed by the solenoids for solenoid-operated valves is used to reduce viscosity in the hydirulic control unit, the electric circuit for the solenoids can be completed briefly to generate heat without changing the mechanical state of the solenoid valve. The operation of the brake system then will not be affected by reason of the application of an electric current to the solenoids that is below a threshold value.

The temperature of the hydraulic fluid can be determined by measuring the resistance, directly or indirectly, of an electrical element near the fluid. This can be used as a feedback signal for the electronic control unit that controls the hydraulic control unit, thereby maintaining the temperature at the desired level. Alternatively, the temperature of the fluid can be estimated by using engine coolant temperature and other variables such as air temperature and vehicle speed, or by measuring the energy exchanged due to circulation of fluid through a thermal mass. When the temperature is determined in this fashion, the electronic control unit will respond to such a feedback signal to effect controlled heating of the fluid based on such estimates of fluid temperature.

PARTICULAR DESCRIPTION OF THE INVENTION

Figure 1:
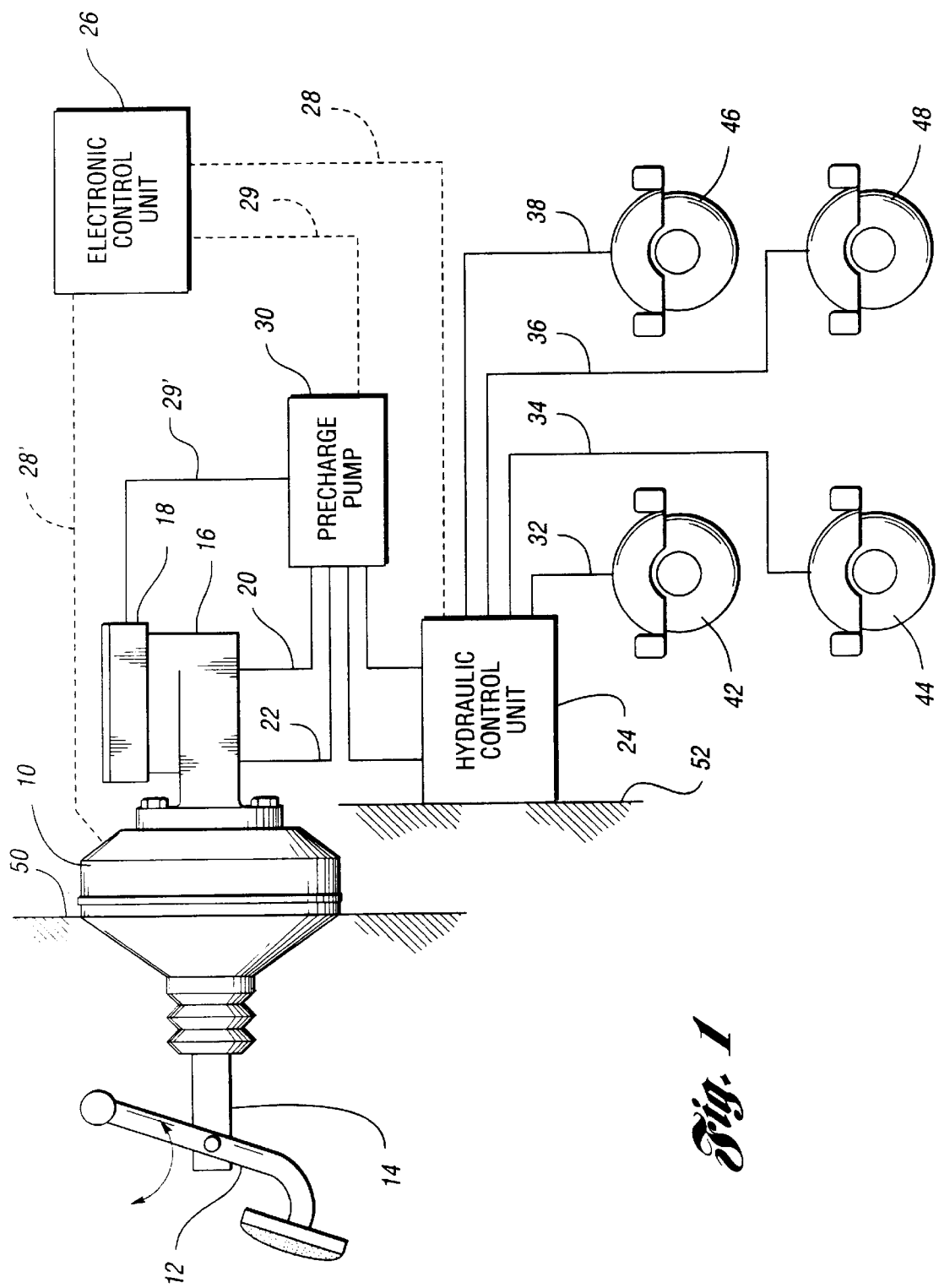
FIG. 1 shows a hydraulic automotive brake system capable of embodying the improvement of the invention, the elements of the system being shown schematically in block diagram form.

FIG. 1 shows a hydraulic brake system including a brake actuator 10, a driver-operated brake pedal 12, and a mechanical linkage 14 that transfers motion of the brake pedal 14 to the brake actuator. The brake actuator may be of a conventional design, such as the brake booster and brake pedal arrangement shown in U.S. Pat. No. 5,551,770. Reference may be made to the '770 patent for the purposes of supplementing the present description. The disclosure of the '770 patent, as well as the disclosure of the '058 patent previously mentioned, is incorporated herein by reference.

The brake system of FIG. 1 includes a master cylinder 16 on which is mounted a fluid reservoir 18. Hydraulic lines 20 and 22 connect the master cylinder to pre-charge pump 30, which in turn is connected by lines 20' and 22' to a hydraulic control unit 24. Hydraulic control unit 24 will be described with reference to the schematic diagram of FIG. 2.

An electronic control unit 26 is connected electronically through signal path 28 to the hydraulic control unit 24. It is connected also to actuator 10 through signal path 28'. Pre-charge pump 30 is connected to reservoir 18 through hydraulic line 29'.

In the system of FIG. 1, a pre-charge pump 30 is used to increase the charge pressure at the inlet side of the pump that forms a part of the control unit 24. The improved system of the invention, however, does not necessarily require a pre-charge pump since the temperature control feature of the invention should make it possible to improve flow from the reservoir to the hydraulic control unit without a pressure boost. The viscosity of the fluid would be sufficiently low to effect the flow requirements for typical automatic brake system functions. The use of a pre-charge pump is optional depending upon design considerations.

Hydraulic control lines 32, 34, 36 and 38 extend to right and left wheel brake actuators 42 and 44 and right and left rear brake actuators 46 and 48, respectively. The actuator 10 can be mounted on the vehicle body or chassis structure as indicated schematically at 50. Similarly, the hydraulic control unit can be mounted in known fashion on the vehicle chassis or suspension, as schematically illustrated at 52.

Figure 2:
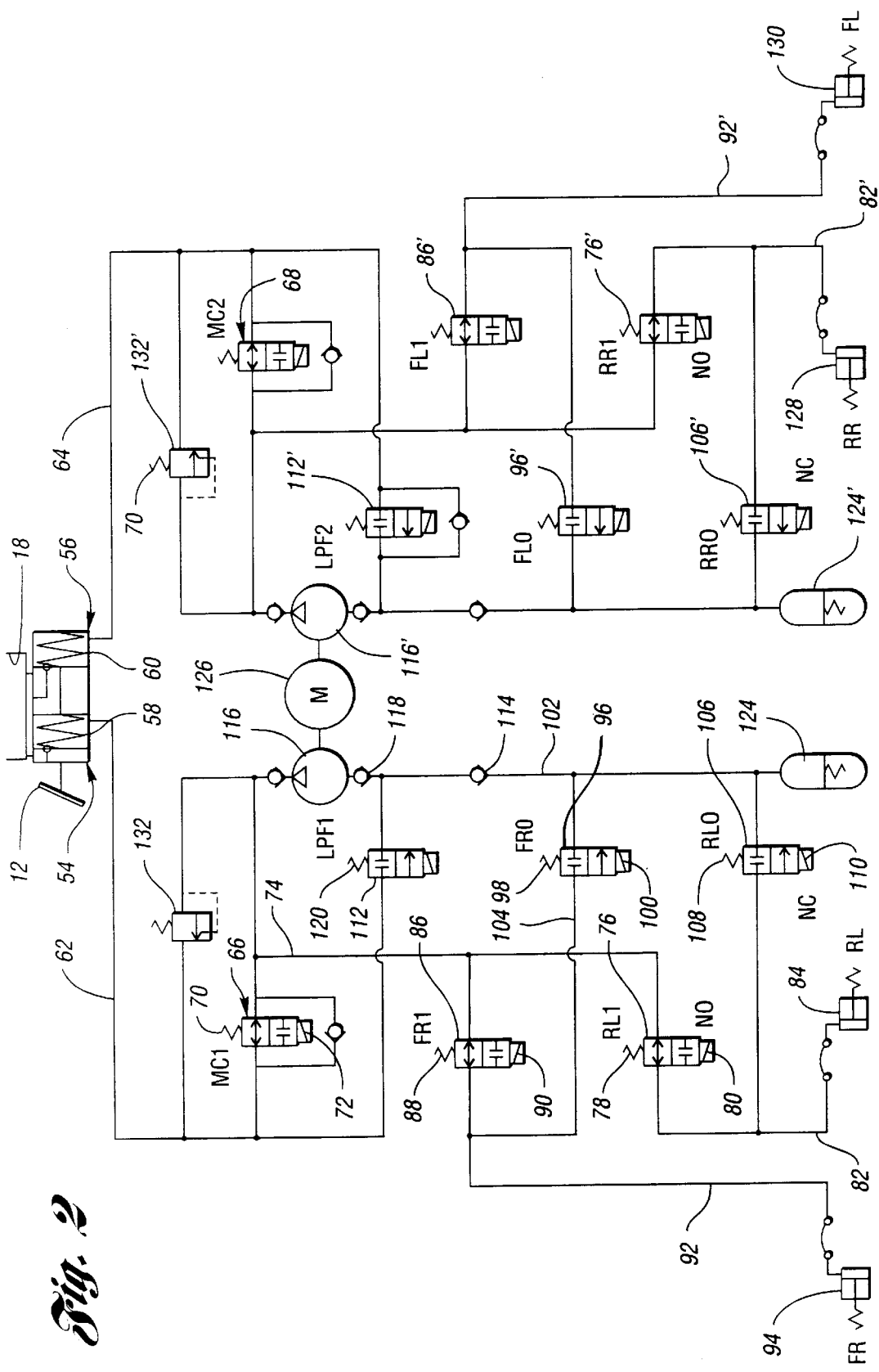
FIG. 2 is a schematic representation of a typical automotive brake control system.

FIG. 2 shows schematically a generic solenoid-operated valve system for an automotive brake system with anti-lock brake capabilities. It includes a master cylinder having a first portion 54 for operating the front-right and rear-left wheel brakes and a second portion 56 for operating the right-rear and front-left wheel brakes. Master cylinder portions 54 and 56 correspond to the master cylinder 16 of FIG. 1.

When brake pedal 12 is actuated, springs 58 and 60 in the master cylinder portions are compressed, thereby displacing fluid into brake fluid conduits 62 and 64 as the brake piston in each master cylinder portion is moved.

A first master cylinder valve 66 is located in the brake fluid conduit 62 and a second master cylinder valve 68 is mounted in the brake fluid conduit 64.

Master cylinder valve 66 normally is open, which is the position shown in FIG. 2. It assumes the open position by reason of the force of valve spring 70. Valve 66 is solenoid operated, the solenoid being indicated at 72. When the solenoid 72 is energized, the master cylinder valve 66 is shifted to a closed position.

The outlet side of the valve 66 is connected to conduit 74 which extends to rear-left inlet valve 76, which normally is open. It is urged to its normally open position by valve spring 78. It includes a solenoid actuator 80 which, when energized, shifts the valve 76 to its closed position.

When the master cylinder portion 54 is pressurized by the operator, braking pressure is distributed through conduit 62, through valve 66, through conduit 74, through valve 76 and through conduit 82 to rear-left wheel brake 84.

A front-right inlet control valve 86 is normally open by reason of the action of valve spring 88. It includes a solenoid actuator 90 which, when energized, closes the valve 86. In the state shown in FIG. 2, valve 86 establishes communication between passage 74 and pressure conduit 92 extending to the front-right wheel brake 94.

A front-right outlet valve 96 is normally closed by reason of the action of valve spring 98, as seen in FIG. 2. Valve 96 includes a solenoid 100 which, when actuated, opens the valve 96, thereby establishing communication between low pressure feed passage 102 and passage 104, which extends to the conduit 92 for the front-right wheel brake 94.

A rear-left low pressure outlet valve 106 is normally closed. It is situated between conduit 102 and conduit 82 extending to the rear-left wheel brake 84. It is biased to its normally closed position by valve spring 108.

Valve 106 includes a solenoid 110 which, when energized, shifts the valve 106 to its open state, thus establishing communication between the low pressure conduit 102 and conduit 82. A low pressure feed valve 112 is situated between conduit 62 and low pressure feed conduit 102, the latter having a one-way flow valve 114 for permitting low pressure fluid flow toward the pump but preventing reverse flow, the pump being shown schematically at 116. A second one-way flow valve 118 is situated on the inlet side of the pump 116.

Valve 112 normally is closed by reason of the biasing action of valve spring 120. Valve 112 includes a solenoid 122 which, when actuated, shifts the valve 112 to its open state.

Low pressure feed passage 102 communicates with a fluid accumulator 124 for the purpose of supplying make-up fluid to the brake system.

Pump 116 is driven by an electric motor 126. A companion pump 116' for the right rear brake 128 and the front-left brake 130 also is driven by the motor 126.

Pump 116' forms a part of the control system that essentially is a duplicate of the control system for the rear-left brake 84 and the front-right brake 94. It contains solenoid-operated valves that are counterparts for the solenoid-operated valves for the brakes 84 and 94. They are designated by similar reference numerals, although prime notations are added.

During operation of the brake control system, the low pressure feed valves 112 and 112' assume the positions shown. The electronic control unit 26, which receives wheel speed sensor signals, detects incipient slipping at the tire/road interface. If, for example, the front-right wheel begins to slip, the front-right flow control valve 96 is actuated, which opens passage 104 to low pressure feed passage 102. Simultaneously, the front-right inlet valve 86 is actuated, thereby blocking pressure distribution from conduit 74 to conduit 92. This results in an instantaneous decrease in the braking capacity of the front-right brake 94.

When the wheel speed sensors detect that incipient wheel slip no longer occurs, the electronic control unit will signal the valves 86 and 96 to resume their previous states. This again results in a pressure increase at the brake 94. The valves 88 and 96 are sequenced in this fashion during brake system control.

The pressure control valves for the other brakes function in a similar fashion. That is, the rear-left outlet valve 106 for brake 84 and the rear-left inlet valve 76 for brake 84 are sequenced by the electronic control unit 26 when incipient wheel slip is detected by the wheel speed sensor for the rear-left wheel.

When brake control functions are not needed, the master control valve 66 again assumes the open position illustrated in FIG. 2.

Any of the solenoid valves shown in FIG. 2 may be actuated for the purpose of generating heat in the brake fluid. There are various restrictions, however, on actuation of the valves when brake control functions are not needed. In those instances, normal brake applications by the driver must be supported while the restrictions are in effect.

The low pressure feed valves 112 and 112' may be actuated continuously. The master cylinder valves 66 and 68, however, should be actuated only until the driver begins to release the brakes. This is one example of the previously mentioned restrictions. At the instant the driver begins to release the brakes, it is necessary for the valves 66 and 68 to be opened in order to avoid continued braking as the pressure in the master cylinder portions 58 and 60 decreases upon relaxation of brake pedal pressure by the driver. The remaining solenoid-operated valves in FIG. 2 may be actuated until the driver begins to apply the brakes.

If the level of the electric current distributed to any of the valves is below a threshold value that is not high enough to cause the valve to change state, the solenoid for that valve may conduct electric current indefinitely.

The control system for controlling brakes 94 and 84 includes an over-pressure relief valve 132. A corresponding relief valve 132' is located in the portion of the control system that controls wheel brakes 128 and 130.

In controlling the temperature of the hydraulic fluid for the hydraulic control unit, a feedback temperature signal may be obtained using any of a variety of techniques, as explained previously. Having determined or estimated the temperature of the hydraulic fluid, the temperature sensor input signal is distributed to the electronic control unit 26. Using that sensor input as a variable, the program counter and the CPU portion of the electronic control unit will address a register that contains a table value indicating the correct relationship between temperature and current. The table values can be obtained empirically in a laboratory setting and programmed into the memory of the electronic control unit. Alternatively, the registers may contain a functional relationship between temperature and current. In that instance, when the register containing the functional relationship is addressed, the CPU portion of the control unit calculates electric current level as a function of temperature.

An output driver portion of the control unit then receives the result of the calculation carried out by the CPU in order to develop an output signal in the form of a current made available to the solenoids for the valves. If restrictions are required for the actuation of the valves, as explained previously, the control logic may include appropriate flags and gates for preventing actuation of any particular solenoid if actuation of that solenoid is inappropriate for the existing operating state of the brake system.

Although a particular embodiment of the invention has been disclosed, the disclosure is not exclusive of variations or modifications in the disclosed design. A person skilled in the art may effect modifications without departing from the scope of the invention. The appended claims are intended to cover all such modifications as well as equivalents thereof.

What is claimed is:

1. A hydraulic control system having a fluid pressure pump with a high pressure outlet side and a low pressure inlet side and having at least one fluid pressure operated member;

hydraulic pressure distributor conduits in a hydraulic circuit on said low pressure inlet side and between said pump and said pressure operated member;

pressure distributor valve means including one solenoid valve actuator for controlling distribution of fluid pressure to said pressure operated member from said pump outlet and another solenoid valve actuator for controlling distribution of hydraulic fluid to said pump inlet; and electronic control circuit means for energizing said solenoid valve actuators at an energy level less than a threshold level at which said actuators will be activated to a changed state and for selectively energizing said solenoid valve actuators at an energy level above said threshold level to activate said actuators;

said solenoid valve actuators being disposed in proximity to said hydraulic fluid whereby electrical energy distributed by said electronic control circuit means to said solenoid valve actuators develops heat that increases temperature at the low pressure inlet side of said pump, thereby decreasing hydraulic fluid viscosity when said actuators are energized at said energy level less than said threshold level.

2. A hydraulic control system as set forth in claim 1 wherein said fluid pressure operated member is a vehicle wheel brake and wherein said hydraulic circuit is a brake control circuit for an automotive vehicle.

3. The hydraulic control system as set forth in claim 1 wherein said electronic control circuit means incudes an electronic processor having output driver portions connected to said solenoid valve actuator, memory registers for storing a pre-calculated relationship between hydraulic fluid temperature and solenoid actuator current, and a logic portion for establishing controlled electrical current delivery to said solenoid valve actuator in accordance with said relationship of operating temperature of said hydraulic fluid and actuator current.

4. A hydraulic control system having a fluid pressure pump with a high pressure outlet side and a low pressure inlet side and having a fluid pressure operated member;

hydraulic pressure distributor conduits in a hydraulic circuit in said low pressure inlet side and between said pump and said pressure operated member;

pressure distributor valve means including solenoid valve actuators for controlling distribution of fluid pressure to said pressure operated member from said pump outlet and for controlling distribution of fluid from said pressure operated member to said pump inlet;

the electric energy supplied to said solenoid valve actuators providing thermal energy for heating hydraulic fluid in said conduits on said low pressure pump inlet side whereby viscosity of the hydraulic fluid on said low pressure pump inlet side is maintained at a temperature level higher than ambient temperature;

said control system further including an electronic control circuit means for energizing said solenid valve actuators at an energy level less than a threshold level at which said actuators will be activated to a changed state and for selectively energizing said solenoid valve actuators at an energy level above said threshold level to activate said actuators, said electronic control circuit means including an electronic processor having output driver portions connected to said pressure distributor valve means and to said solenoid valve actuators for heating said hydraulic fluid when said actuators are energized at said energy level less than said threshold level;

said electronic processor having memory registers for storing a pre-calculated relationship between hydraulic fluid temperature and actuating current for said valve means, and a logic portion for establishing controlled electrical current delivery to said valve means in accordance with said relationship between operating temperature of said hydraulic fluid and said current.

* * * * *